United States Patent [19]

Wittkopf

[11] Patent Number: 5,058,496
[45] Date of Patent: Oct. 22, 1991

[54] ROLL APPARATUS WITH COOLING SYSTEM FOR MAINTAINING CONSTANT GAP SIZE AND METHOD

[75] Inventor: Eugene W. Wittkopf, Little Suamico, Wis.

[73] Assignee: Integrated Design Corp., Green Bay, Wis.

[21] Appl. No.: 583,579

[22] Filed: Sep. 17, 1990

[51] Int. Cl.⁵ ........................ B30B 13/00; B30B 3/04
[52] U.S. Cl. ...................................... 100/35; 100/43; 100/155 R; 100/168; 100/172; 384/448; 384/467
[58] Field of Search ............... 100/38, 47, 92, 93 RP, 100/155 R, 168, 172, 35, 43; 384/313, 316, 467, 900, 448

[56] References Cited

U.S. PATENT DOCUMENTS

| | | | |
|---|---|---|---|
| 1,421,805 | 7/1922 | Melown | 384/313 |
| 2,170,667 | 8/1939 | Smitmans | 384/313 |
| 2,352,206 | 6/1944 | Kendall | 384/476 |
| 2,710,778 | 6/1955 | Miller | 384/316 |
| 2,747,945 | 5/1956 | Fulton | 384/467 |
| 3,550,971 | 12/1970 | Wochnik | 384/316 |
| 3,704,669 | 12/1972 | Christoff | 100/93 RP X |
| 4,934,838 | 6/1990 | Morner | 384/476 |
| 4,948,269 | 8/1990 | Hamilton | 384/467 |

FOREIGN PATENT DOCUMENTS 1033839  6/1966  United Kingdom ........... 100/93 RP

Primary Examiner—Harvey C. Hornsby
Assistant Examiner—Stephen F. Gerrity
Attorney, Agent, or Firm—Senniger, Powers, Leavitt & Roedel

[57] ABSTRACT

Apparatus comprising a frame, a pair of generally parallel rolls each having trunnions at its ends journaled for rotation in bearings in the frame with a gap between the rolls, and means for driving the rolls. The rotation of each trunnion in its bearing tending to generate heat which tends to raise the temperature of the trunnions and frame above the ambient temperature. The apparatus includes a cooling system, having a coolant supply manifold and a coolant return manifold, each with a branch for each bearing, and a pump for circulating coolant through each bearing. The cooling system also includes a device for controlling the temperature of the coolant. A temperature sensor senses the frame temperature, and a control, responsive to the temperature sensor, controls the device for controlling the temperature of the coolant to maintain a predetermined temperature differential between the temperature of the frame and the temperature of the coolant, with the coolant temperature lower than the frame temperature, whereby the gap between the rolls is maintained substantially constant.

10 Claims, 5 Drawing Sheets

ROLL APPARATUS WITH COOLING SYSTEM FOR MAINTAINING CONSTANT GAP SIZE AND METHOD

BACKGROUND OF THE INVENTION

This invention relates to apparatus of the type having a pair of substantially parallel journaled rolls that are spaced by a gap, for example rotary die cutting equipment, and in particular to a bearing cooling system for such apparatus for maintaining the gap size substantially constant.

Many different types of apparatus employ a pair of rolls that are journaled substantially parallel to each other and separated by a gap, for example rotary die cutting equipment. In some of these apparatus, the gap size is critical, and thus maintaining this gap size is important. However, for a number of reasons the gap size can vary during use of the apparatus. A significant contributor to the variance in the gap size is thermal expansion of the apparatus from heat generated by the turning of the rolls. Some of the heat is generated by the forces and friction on the gears driving the rolls. Some of the heat is generated by forces on the bearings in which the rolls are journaled (including pre-loading), and bearing resistance and friction. Controlling the heat generated by the turning of the rolls would reduce the thermal expansion of the apparatus and help maintain the gap size substantially constant.

SUMMARY OF THE INVENTION

It is among the objects of the prevent invention to provide an apparatus of the type that has a pair of substantially parallel journaled rolls that are spaced by a gap which includes some means for controlling the heat generated by the turning of the rolls in order to maintain the gap substantially constant.

Generally, the apparatus of the present invention comprises a frame; a pair of rolls, each having trunnions at its ends. The trunnions are journaled for rotation in bearings in the frame, with the axes of the rolls at least substantially parallel, and with a gap between the rolls. The apparatus also includes means for driving the rolls. The rotation of each trunnion in its bearing tends to generate heat which is transferred to the respective trunnion and to the frame, which tends to raise the temperature of the trunnions and frame above the ambient temperature. The apparatus further comprises a cooling system for cooling each bearing. This cooling system comprises means for pumping coolant through the bearing and means for controlling the temperature of the coolant. A temperature sensor is associated with the frame for sensing the frame temperature. Means, responsive to the temperature sensor, controls the coolant temperature control means to maintain a predetermined temperature differential between the temperature of the frame and the temperature of the coolant, with the coolant temperature lower than the frame temperature whereby the gap between the rolls is maintained substantially constant.

The cooling system controls the heat generated by the turning of the rolls, reducing thermal expansion of the frame and the other components of the apparatus, and stabilizing the gap size. Thus, there is less variance in the size of the gap between the rollers of this apparatus, making the apparatus suitable for uses in which the gap size is critical, for example in rotary die cutting.

These and other features and advantages will be in part apparent and in part pointed out hereinafter.

BRIEF DESCRIPTION OF THE DRAWINGS

Corresponding reference numerals indicate corresponding parts throughout the several views of the drawings.

DETAILED DESCRIPTION OF THE PREFERRED EMBODIMENT

Figure 1:
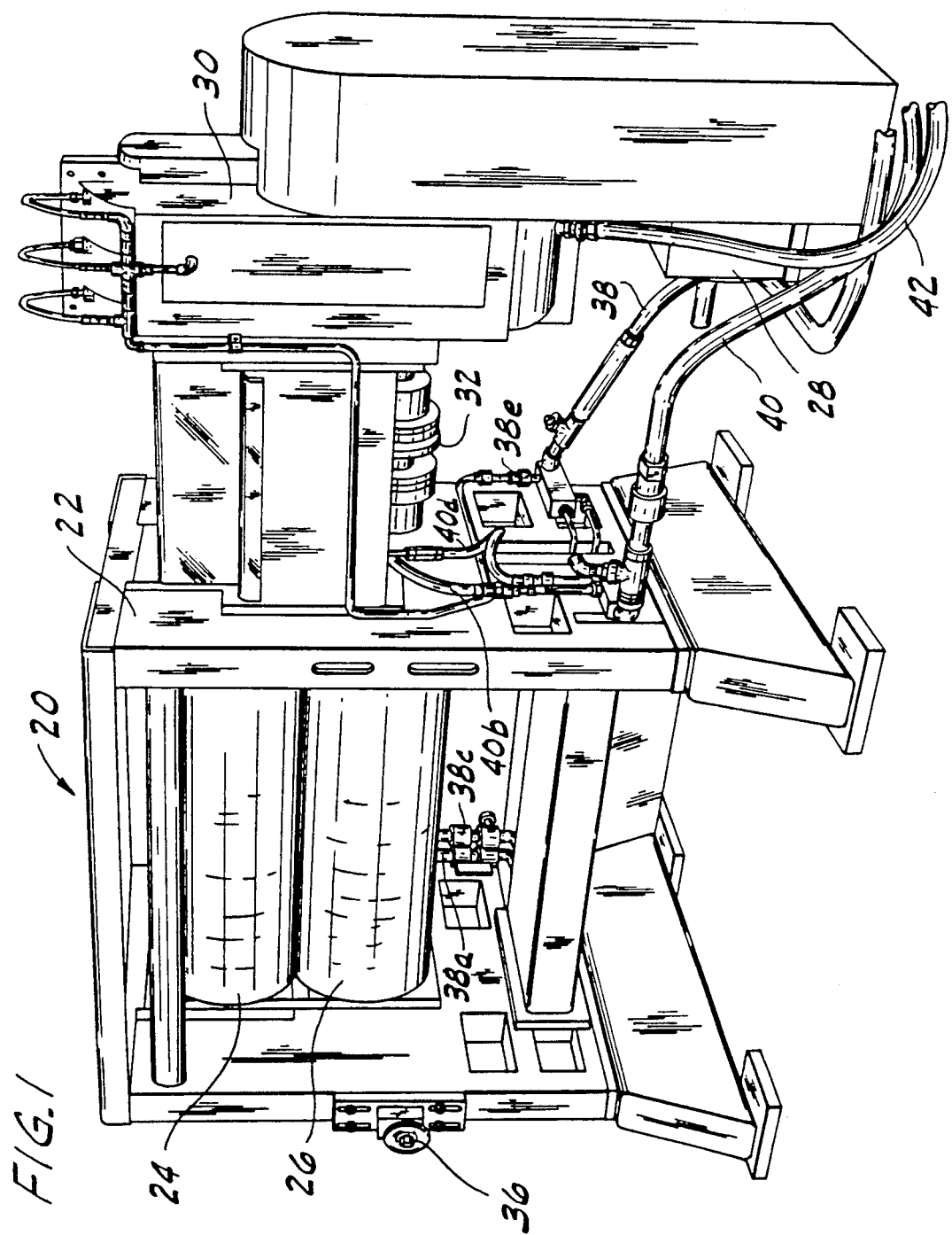
FIG. 1 is a perspective view of a rotary die cutter constructed according to the principles of this invention.
Figure 2:
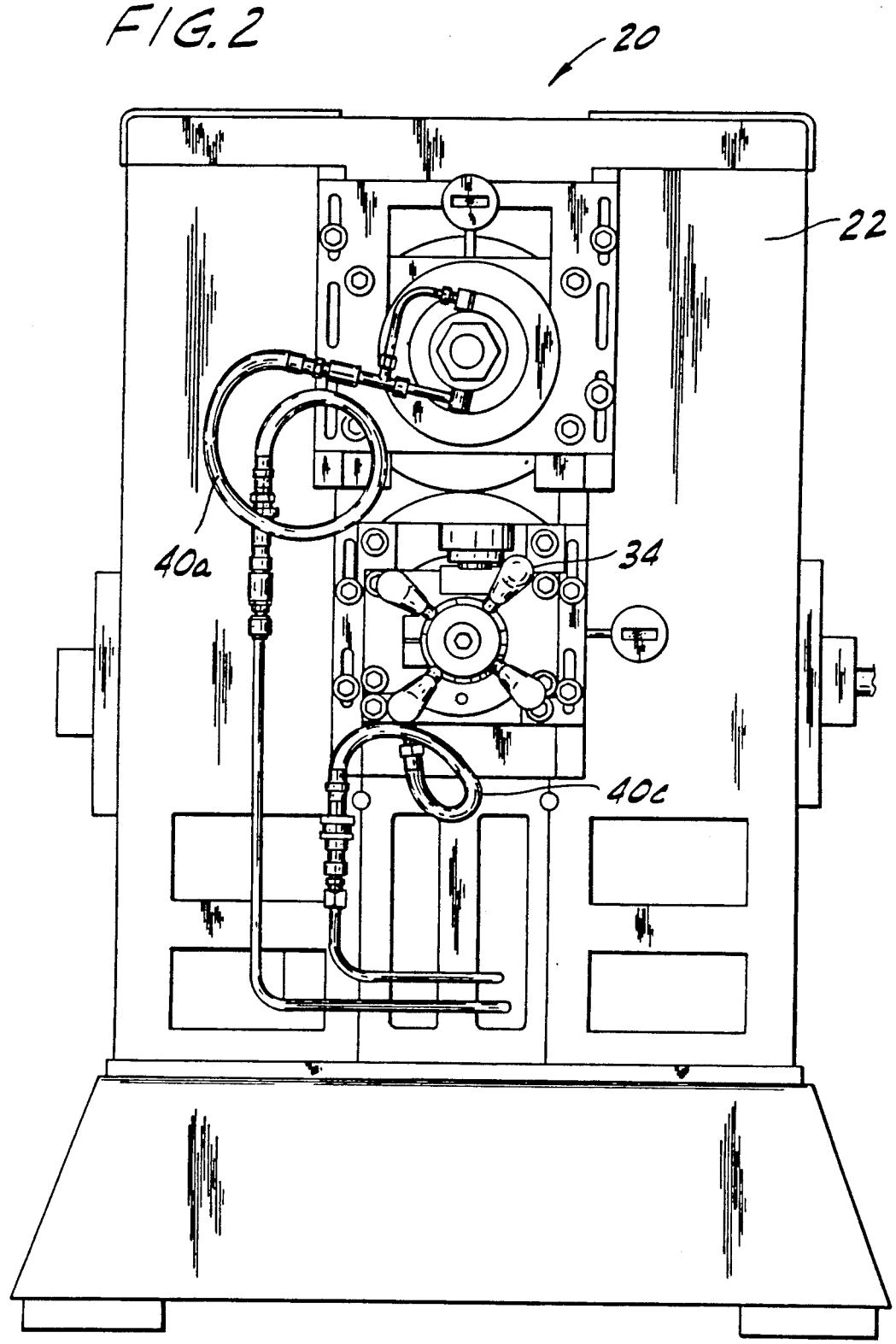
FIG. 2 is an end elevation view of the rotary die cutter constructed according the principles of this invention.

A rotary die cutter constructed according to the principles of this invention is indicated generally as 20 in FIGS. 1 and 2. Although this description of the preferred embodiment relates to a rotary die cutter, the invention is not so limited, and applies to any apparatus that has a pair of substantially parallel journaled rolls in which it is important to maintain the size of the gap between the rolls.

Generally, the rotary die cutter 20 comprises a frame 22, and a pair of rolls 24 and 26. The rolls 24 and 26 may be provided with suitable cutting blades and blankets, as is well known in the art of rotary die cutting. Each of the rolls 24 and 26 has trunnions T at its ends which are journaled for rotation in bearings B in the frame 22 (see FIG. 5). There are two bearings B supporting each roll. The axes of the rolls 24 and 26 are substantially parallel, and they are separated by a gap G (not shown).

Figure 4:
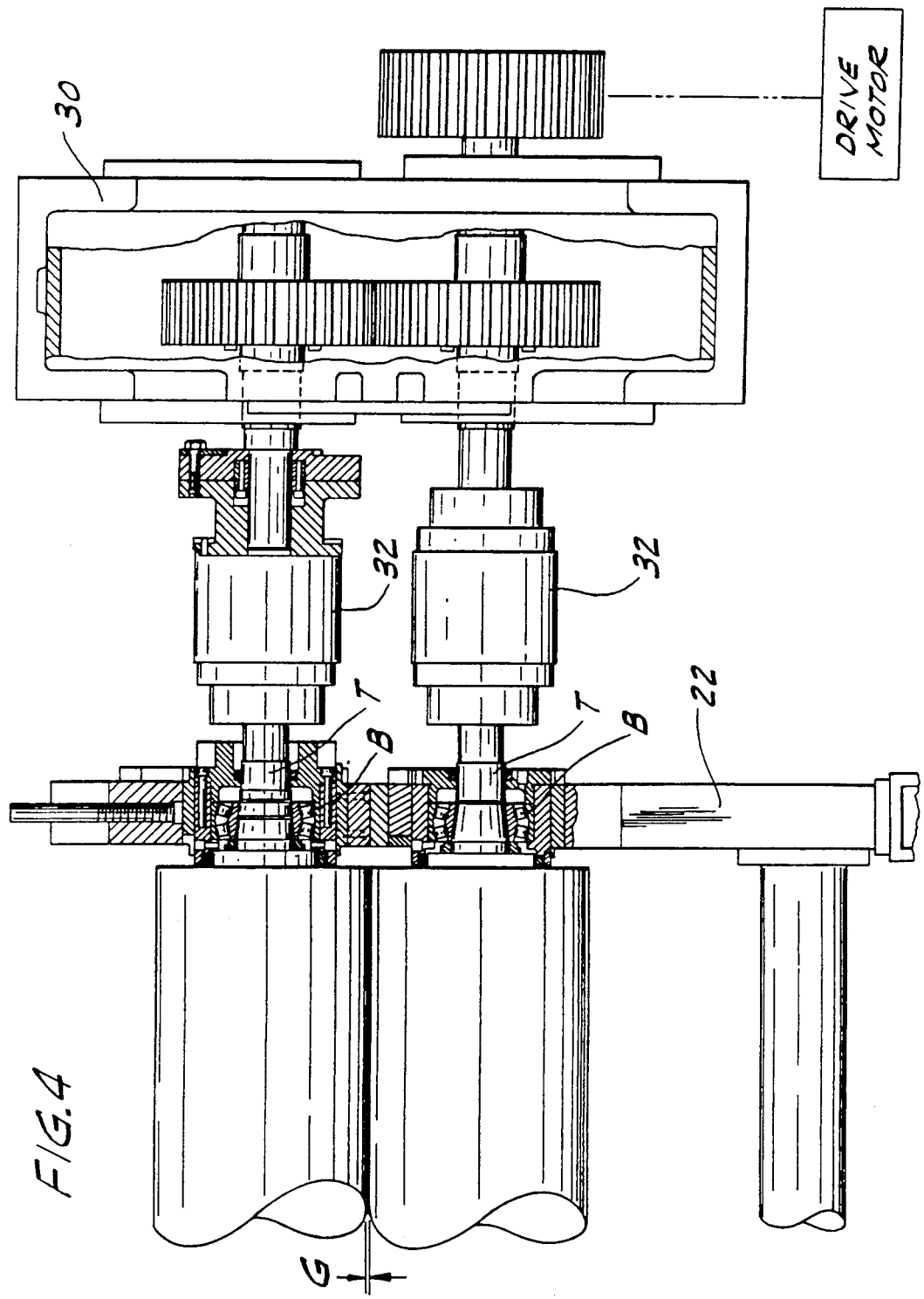
FIG. 4 is a partial front elevation view of the rotary die cutter with portions broken away for illustration purposes.

The die cutter 20 also includes means for driving the rolls. In prior art roll apparatus this driving means included a motor, gears on the rolls 24 and 26, and a gear box connecting the motor and the gears on the rolls. However, with this type of drive the gears on the rolls apply forces on the bearings which generates heat as the rolls turn in the bearings. Thus, as shown in FIGS. 1 and 4, according to this invention the driving means preferably comprises a motor 28, a gear box 30, and flexible anti-backlash couplings 32 between the gear box 30 and the trunnions T of the rolls 24 and 26.

In rotary die cutters, as in other similar types of apparatus, the gap G is extremely important, and several means are provided for adjusting the orientation and spacing of the rolls to control the gap G. For example, the rotary die cutter 20 can include a wheel 34 for transversely adjusting the lower roll 26 in the frame 22. The die cutter 20 may also include a wheel 36 for adjusting the skew of the lower roll 26 relative to the upper roll 24. Other adjustments are usually provided for as well, for circumferential phasing and gap adjustment.

The rotation of each trunnion T in its respective bearing B tends to generate heat which is transferred to the trunnion and to the frame, which tends to raise the temperature of the trunnions and the frame above the ambient temperature. This heat may be caused by the cutting forces resisted by the bearings, bearing deformation friction, and any preloading of the bearings. This heat may also be caused by gear separation forces which are resisted by the bearings and gear tooth friction, however these causes are eliminated if the rolls are separated from the gears with the flexible anti-backlash couplings 32. The heat generated in the bearings B is transferred from the inner race to the trunnions T, and from the outer race to the frame 22. In prior art roll apparatus this would increase the temperature of the components of the die cutter 20, resulting in thermal expansion of those components so that the size of the gap G changes, potentially to the point that the operation of the rotary die cutter 20 is impaired.

According to the principles of this invention, the die cutter 20 further comprises a cooling system for cooling each bearing B. This cooling system comprises means for pumping coolant through each bearing and means for controlling the temperature of the coolant. A temperature sensor is associated with the frame 22 for sensing the frame temperature. The cooling system also includes means, responsive to the temperature sensor, for controlling the coolant temperature control means substantially to maintain a predetermined temperature differential between the temperature of the frame 22 and the temperature of the coolant, with the coolant temperature lower than the frame temperature. Thus the gap between the rolls is maintained substantially constant.

Figure 3:
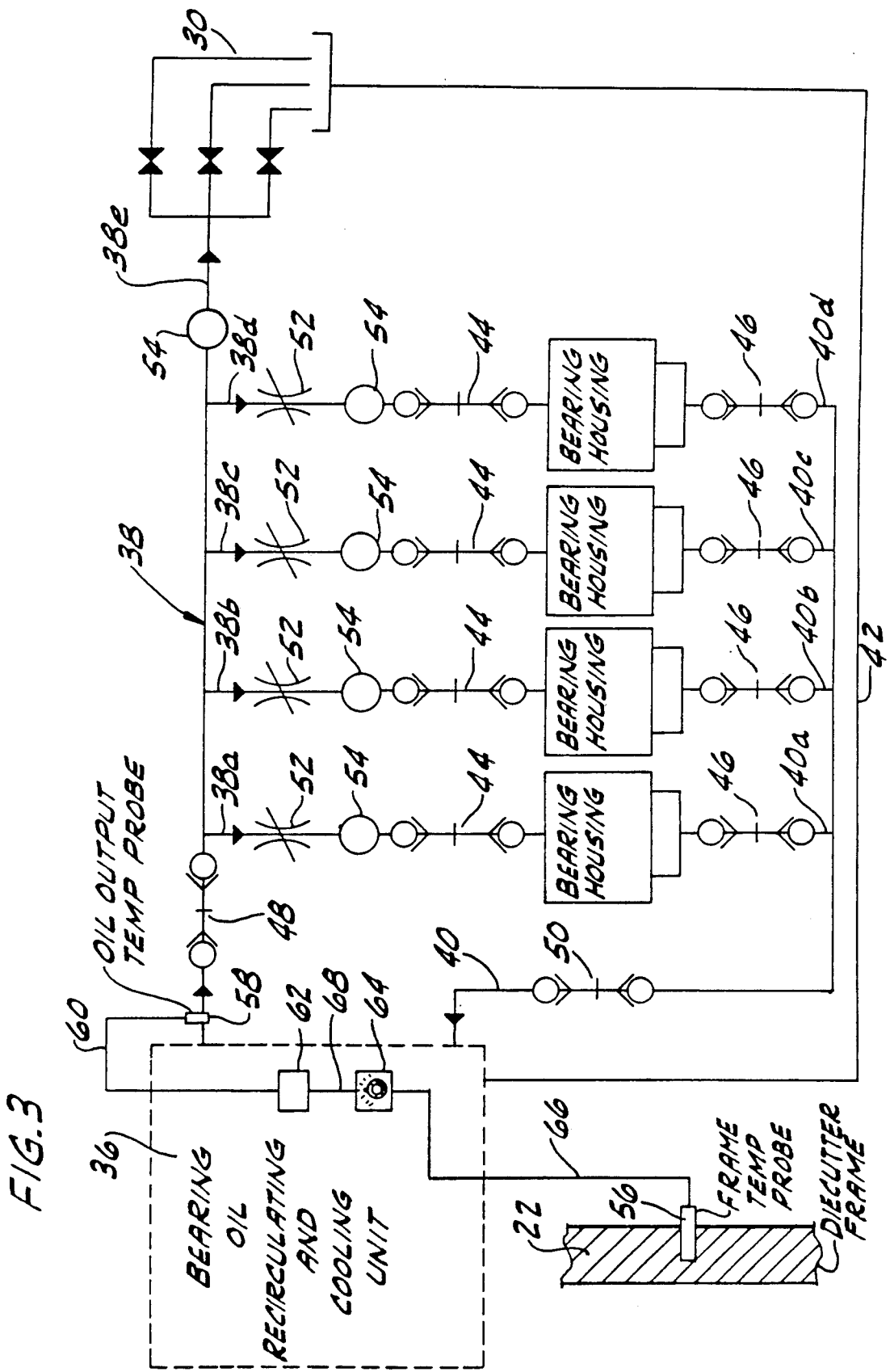
FIG. 3 is a schematic view of the cooling system incorporated into the rotary die cutter.

As shown schematically in FIG. 3, the cooling system comprises a cooling unit 36 for recirculating and cooling the coolant, which includes means for pumping the oil for recirculating it, means for cooling the oil and means for controlling the temperature of the oil delivered by the unit. A coolant supply manifold 38 extends from the unit 36, with branches 38a, 38b, 38c, and 38d extending to the inner side (i.e. the side on which the roller is located) of each of the bearings B, to supply each bearing with coolant. There is also a branch 38e that extends to the gear box 30. A coolant return manifold 40, having branches 40a, 40b, 40c, and 40d that extend from the outer sides (i.e. the side opposite the side on which the roll is located) of each bearings, extends to the unit 36 to return the coolant to the unit 36. A separate coolant return line 42 extends from the gear box 30 to the unit 36 to return the coolant to the unit 36.

Each of the branches 38a, 38b, 38c, and 38d supplying coolant preferably connects with its respective bearing B with a quick disconnect coupling 44 having two check valves. Each of the branches 40a, 40b, 40c, and 40d returning coolant preferably connects with its respective bearing B with a quick disconnect coupling 46 having two check valves. The connection between the supply manifold 38 and the unit 36 preferably includes a quick disconnect coupling 48, Likewise the connection between the return manifold 40 and the unit 36 preferably includes a quick disconnect coupling 50. Each of the branches 38a, 38b, 38c, and 38d includes a flow control valve 52 and a flow meter 54. There is preferably also a flow meter 54 in branch 38e.

Figure 5:
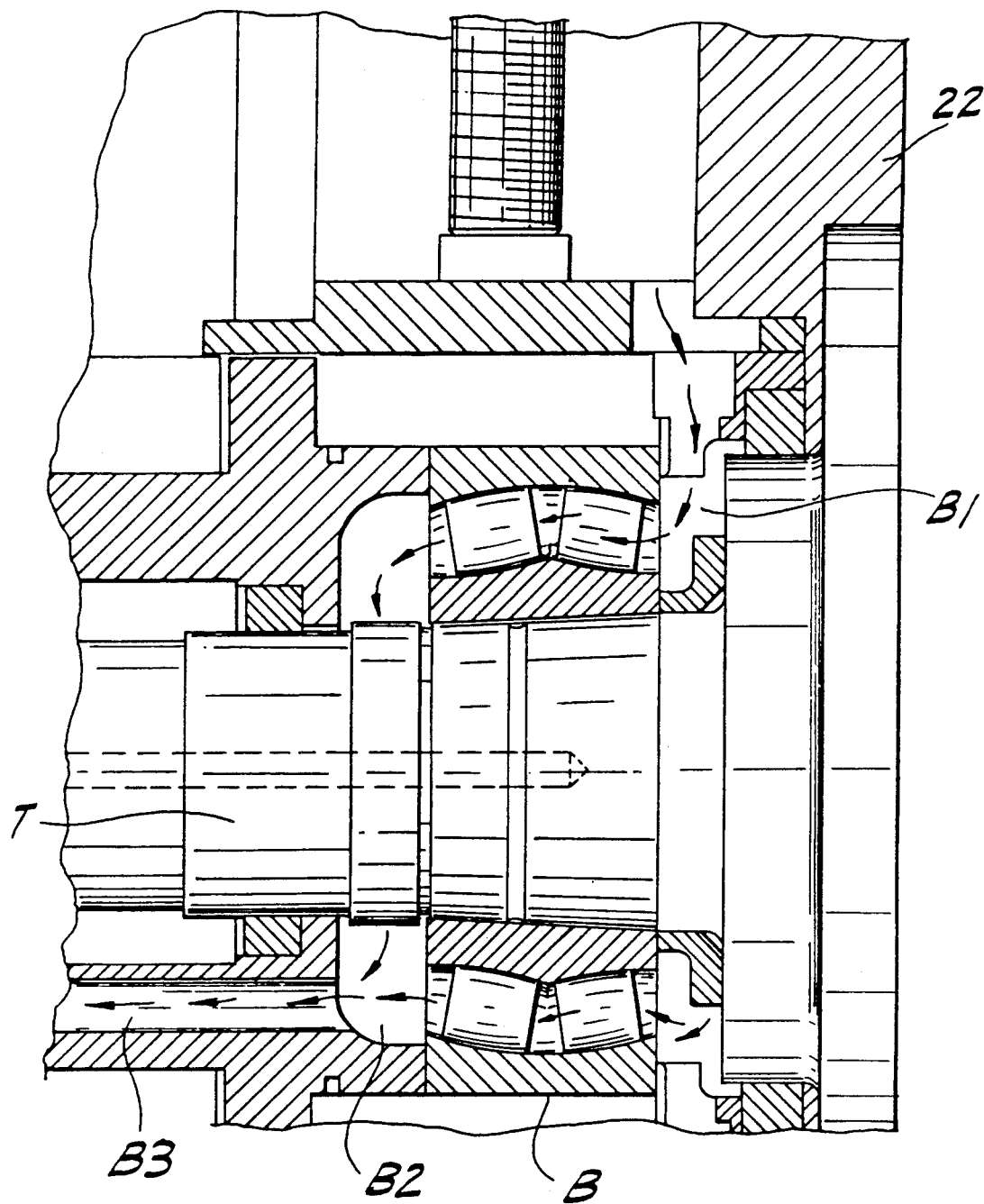
FIG. 5 is a partial cross-sectional view through one of the bearings journaling one of the rolls in the rotary die cutter.

Referring to FIG. 3, there is indicated at 56 a temperature sensor mounted on the frame for sensing the temperature of the frame, which may be higher than ambient temperature due to heating of the frame by generation of heat in the bearings. At 58 is indicated a temperature sensor for sensing the temperature of coolant delivered by the cooling unit 36. The sensor 58 monitors the temperature of coolant delivered by unit 36 and is connected as indicated at 60 to a controller 62, which may be an electronic thermostatic controller included in unit 36, for controlling the operation of unit 36 to deliver coolant at a temperature differing from that of the frame, and lower than that of the frame, by a predetermined differential. This differential is set in by means of a temperature offset control 64, which may be an electronic control included in the unit 36, and which is interconnected with the frame temperature sensor 56 as indicated at 66 and with controller (thermostat) 62 as indicated at 68. Thus, assuming control 64 is set to maintain a 4° differential, for example, and the frame temperature sensor 56 senses a 70° frame temperature, control 64 sets controller (thermostat) 62 to control unit 36 to deliver coolant at 66° (four degrees lower than the frame temperature). If the frame temperature rises to 71°, control 64 sets controller 62 to control unit 36 to deliver coolant at 67°, etc. As best shown in FIG. 5, the coolant is delivered to the inside side of the bearings B (the right side in FIG. 5) by one of the branches of the supply manifold 38. The coolant is delivered to an annular chamber B1 on the inside of the bearing B, formed between the end of the roll and the bearing. The coolant passes between the inner and outer races of the bearing B, around the rollers between the races, to an annular chamber B2 on the outside of the bearing B formed between the bearing and a cover plate. From the chamber 82, the coolant passes through a passage B3 in the cover plate to one of the branches of the return manifold 40, which returns the coolant to the unit 36. Because the coolant is maintained at a temperature lower than the temperature of the frame, the coolant removes the heat generated by the bearings B. Thus, the circulation of the coolant helps to maintain the temperature of the parts of the apparatus, reducing thermal expansion and thereby maintaining the gap G substantially constant.

The temperature differential between the coolant and the frame is preferably about 4°–6° F., and is maintained even as the temperature of the frame changes with changes in the ambient temperature. For example, at the start of the day the ambient temperature and the temperature of the frame 22 might be 70° F. With a 4° temperature differential, the unit 36 would maintain the temperature of the coolant at 66°. During the day because of changes in ambient temperature and because of heat generated by operation of the apparatus, the temperature of the frame 22 might increase to 75°. As the temperature of the frame increases, the temperature of the coolant is maintained at the 4° differential, so that when the temperature of the frame reaches 75°, the temperature of the coolant is about 71°.

The temperature differential between the coolant and the frame depends upon the amount of heat being generated by the turning of the rolls, and thus depends upon the loading of the rolls and their speed. For most rotary die cutting applications, a temperature differential ranging between about 4° to about 6° has been found to be satisfactory. In addition to adjusting the temperature differential, the flow rate of the coolant can be adjusted with control valves 52 and monitored with meters 54 to adjust the cooling.

OPERATION

To operate the die cutter 20, at start up the predetermined temperature differential is selected and set on the unit 36. This selection is made empirically based on the anticipated cutting load on the rollers 24 and 26, and on the cutting speed. The rate of flow of coolant through the bearings B is also selected and adjusted with valves

52. The die cutter is then started. As time Progresses increases in ambient temperature and heat generated by operation may increase the temperature of the frame. The temperature of the coolant being circulated through the bearings automatically changes so that the temperature of the coolant is always the predetermined temperature differential lower than the temperature of the frame sensed by the sensor 56.

The cooling of the bearings reduces the amount of the heat transferred to the trunnions T, the frame 22, and the other components of the die cutter 20, which in turn reduces the thermal expansion of these components and thus reduces the changes in gap size.

The isolation of the rollers from the driving gears with the flexible couplings also helps by reducing the loading on the bearings and thus the heat generated. This reduction in heat generation contributes to the reduction in thermal expansion and the stabilization of the gap size.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus comprising:
   a frame;
   a pair of rolls each having trunnions at its ends journaled for rotation in bearings in the frame with the axes of the rolls at least substantially parallel and with a gap between the rolls;
   means for driving the rolls;
   rotation of each trunnion in its bearing tending to generate heat which is transferred to the respective trunnion and to the frame and thereby tends to raise the temperature of the trunnions and frame above the ambient temperature;
   a cooling system for cooling each bearing comprising means for pumping coolant through the bearing and means for controlling the temperature of the coolant;
   a temperature sensor associated with the frame for sensing the frame temperature; and
   means responsive to the temperature sensor for controlling the coolant temperature control means substantially to maintain a predetermined temperature differential between the temperature of the frame and the temperature of the coolant with the coolant temperature lower than the frame temperature, whereby the gap between the rolls is maintained substantially constant.

2. Apparatus as set forth in claim 1 wherein the means for driving the rolls comprises:
   a first gear in a gear case interconnected with a trunnion of one roll by a flexible coupling, a second gear in said gear case interconnected with a trunnion of the second roll by a flexible coupling, and means for circulating coolant through the gear case.

3. Apparatus as set forth in claim 1 wherein the coolant is oil for lubricating the bearings in addition to cooling them.

4. Apparatus as set forth in claim 1 wherein the cooling system for cooling each bearing comprises a coolant supply manifold having a branch extending to each bearing, and a coolant return manifold having a branch extending from each bearing.

5. Apparatus as set forth in claim 4 wherein each branch of the coolant supply manifold includes a valve for adjusting the rate of flow of coolant through the branch.

6. Apparatus as set forth in claim 5 wherein each branch of the coolant supply manifold includes a meter for measuring the flow of coolant through the branch.

7. Apparatus as set forth in claim 4 wherein each branch of the coolant supply manifold includes a quick-connect connector for quickly connecting and disconnecting the branch to its respective bearing.

8. Apparatus as set forth in claim 4 wherein each branch of the coolant return manifold includes a quick-connect connector for quickly connecting and disconnecting the branch to its respective bearing.

9. A method of stabilizing the size of the gap between two substantially parallel rolls, each having trunnions at its ends journaled for rotation in bearings in a frame, rotation of each trunnion in its bearing tending to generate heat which is transferred to the respective trunnion and to the frame and thereby tends to raise the temperature of the trunnions and frame above the ambient temperature, the method comprising:
   sensing the temperature of the frame;
   circulating a coolant through each bearing;
   controlling the temperature of the coolant in response to the sensed temperature of the frame to maintain a predetermined temperature differential between the temperature of the frame and the temperature of the coolant, with the coolant temperature lower than the frame temperature, whereby the gap between the rolls is maintained substantially constant.

10. The method according to claim 9 wherein the temperature differential between the frame and the coolant is maintained between about 4° and about 6° F.

* * * * *